United States Patent [19]

Esselborn et al.

[11] Patent Number: 4,476,252

[45] Date of Patent: Oct. 9, 1984

[54] PROCESS FOR THE SYNTHESIS OF POLYMERS WITH LATERALLY LINKED POLYOXYALKYLENE CHAINS AND THEIR USE FOR THE PRODUCTION OF POLYURETHANES

[75] Inventors: Eberhard Esselborn, Essen; Jürgen Fock, Düsseldorf, both of Fed. Rep. of Germany

[73] Assignee: Th. Goldschmidt AG, Essen, Fed. Rep. of Germany

[21] Appl. No.: 549,202

[22] Filed: Nov. 4, 1983

[30] Foreign Application Priority Data

Nov. 6, 1982 [DE] Fed. Rep. of Germany ....... 3241084

[51] Int. Cl.³ .............................................. C08G 18/14
[52] U.S. Cl. .................................. 521/172; 521/173; 525/328.9; 526/329.5; 526/330; 528/75; 528/76; 528/77
[58] Field of Search .............................. 521/172, 173; 525/328.9; 526/329.5, 330; 528/75, 76, 77

[56] References Cited

U.S. PATENT DOCUMENTS 3,247,151  4/1966  Casey et al. .......................... 526/330
3,316,222  4/1967  Jones et al. .......................... 526/330

*Primary Examiner*—Maurice J. Welsh
*Attorney, Agent, or Firm*—Toren, McGeady and Stanger

[57] ABSTRACT

Process for the synthesis of polymers with laterally linked polyoxyalkylene chains by the free radical polymerization of polyoxyalkylene ethers with olefinic double bonds with other vinyl compounds, capable of copolymerizing wherein the polyoxyalkylene ethers of allyl and/or methallyl alcohol are copolymerized in a known manner with vinyl esters of lower carboxylic acids or mixtures of vinyl esters of lower carboxylic acids with up to 50 mole percent of esters of acrylic or methacrylic acid. The compounds can be used to advantage as reaction components having hydroxyl groups in the production of polyurethanes. In particular, they improve the mechanical properties of polyurethane foams, such as, for example, their compression hardness.

8 Claims, No Drawings

PROCESS FOR THE SYNTHESIS OF POLYMERS WITH LATERALLY LINKED POLYOXYALKYLENE CHAINS AND THEIR USE FOR THE PRODUCTION OF POLYURETHANES

BACKGROUND OF THE INVENTION

1. Field of the Invention

The invention relates to a process for the synthesis of polymers with laterally linked polyoxyalkylene chains by the free radical polymerization of polyoxyalkylene ethers with olefinic double bonds with other vinyl compounds, capable of copolymerizing, and the use of such polymers for the production of polyurethanes.

2. Description of the Prior Art

Polymers with laterally linked long-chain radicals have proven to be very effective surface-active compounds. Polysiloxanes with laterally linked polyoxyalkylene chains are used as foam stabilizers in the production of polyurethane foams. Depending on their hydrophilic/hydrophobic balance, they can also be used as emulsifiers or as emulsion breakers, as well as for preventing or eliminating foam in aqueous or organic systems.

Polymers with laterally linked polyalkylene oxide chains, which can be synthesized by reacting polyalkylene oxides having at least two free hydroxyl groups on the starting alcohol with compounds which are di- or polyfunctional with respect to the hydroxyl groups on the starting alcohol, are described in German patent application No. P 31 09 700.6. Optionally, these reactions may be carried out in the presence of solvents and/or catalysts and/or elevated temperatures. The compounds are further distinguished by a high surface activity and have a relatively low viscosity even at higher molecular weights.

It is furthermore known that polymers with laterally linked polyalkylene oxide chains can be synthesized by the free radical polymerization of polyoxyalkylene ethers having olefinic double bonds in the starting alcohol. For example, partial esterification of alkylene glycol with acrylic acid and the addition of alkylene oxide to the free OH groups is known from the journal "Plaste und Kautschuk" (28, Volume 7, 1981, page 367). The compounds so obtained can be polymerized in the presence of other monomeric compounds suitable for polymerization to form polymers with laterally linked polyoxyalkylene chains. These compounds, however, have the disadvantage that they can be saponified in acidic or alkaline media, the laterally linked polyoxyalkylene chains being split off.

The alkoxylation products of copolymers of allyl alcohol and alkenyl aromatic compounds and their use in the production of lacquers and foams based on polyurethanes is described in U.S. Pat. No. 2,965,615. The large amount of unreacted allyl alcohol remaining after the reaction which results from unfavorable polymerization parameters, the necessary removal of the solvents required for carrying out the free radical polymerization after the alkoxylation, and the high viscosity of the products of the process, are disadvantages of this process.

A process for copolymerizing polyoxyethylene ethers of allyl alcohol with acrylic or methacrylic acid or their salts is described in Japanese patent publication No. 81 81 320. However, on repeating this process, it turns out that either gelling takes place during the polymerization because of crosslinking by way of principal valence bonds or polymers with only a low molecular weight are obtained.

Dispersions of graft copolymers which are synthesized from vinyl monomers and polyetherols and which are used for the production of polyurethanes, are described in U.S. Pat. Nos. 3,383,351 and 3,652,639. The polyols used in accordance with the first mentioned patent, are completely free of ethylenic double bonds. It is noted that the presence of ethylenic double bonds favors the formation of crosslinking bridges and, in so doing, increases the viscosity of the dispersions formed in an undesirable manner. It is a significant disadvantage of the process of U.S. Pat. No. 3,383,351 that the stable dispersions prepared from numerous customary vinyl monomers, such as, styrene, cannot be processed if these monomers are used in an amount sufficient to impart the desired mechanical strength to polyurethanes. On the other hand, it is noted in U.S. Pat. No. 3,652,639 that homogeneous graft copolymers based on acrylonitrile can be synthesized in liquid media by the in situ polymerization of acrylonitrile with an unsaturated polyol, in the presence of a catalyst which forms free radicals. The polyols used as described in U.S. Pat. No. 3,652,639, contain at least about 1 mole of unsaturated units per mole of polyol. A disadvantage of these products is their relatively high viscosity, which can be attributed to the presence of graft copolymers of extremely small particle size and to the formation of crosslinking bridges.

German patent No. 2 359 617 relates to dispersions of graft copolymers which are prepared by polymerizing a vinyl monomer in situ in the presence of a free radical forming catalyst in a polyetherol, which contains 0.1 to 0.7 moles of unsaturated units per mole of polyetherol. It is a significant disadvantage of this process that, unless a high viscosity or crosslinking of products of the reaction is acceptable, the ratio of unsaturated to saturated polyetherols cannot exceed an upper limit. The reason for this is that, because of statistical distribution, the unsaturated polyetherols described may also carry several unsaturated double bonds in one molecule. Therefore, quite highly viscous, cloudy and even gelled products may be formed in free radical graft copolymerization at the upper range of the ratio given.

SUMMARY OF THE INVENTION

We have discovered a method for preparing polymers with laterally linked polyoxyalkylene chains which contain a large number of laterally linked polyoxyalkylene chains in the macromolecule and which have a relatively low viscosity in spite of the high molecular weight, and are suitable as raw materials for the production of polyurethanes.

This is accomplished by copolymerizing polyoxyalkylene ethers of allyl and/or methallyl alcohol in a known manner with vinyl esters of lower carboxylic acids or with mixtures of vinyl esters of lower carboxylic acids with up to 50 mole percent of esters of acrylic or methacrylic acid.

DESCRIPTION OF THE PREFERRED EMBODIMENT

Since the unsaturated double bond is an integral component of the starting alcohol, it is possible to introduce only one double bond into a polymer chain and, by so doing, avoid the danger of crosslinking. It was surprising to those skilled in the art that polyoxyalkylene ethers of allyl and/or methallyl alcohol can be polymerized with the aforementioned monomers to copolymers of relatively high molecular weight. Thus, on the one hand, it is known that allyl and methallyl compounds in free radical polymerization after transfer from a growing chain, form relatively stable allyl radicals so that only oligomers of relatively low molecular weight are obtained and, on the other hand, hardly any linear copolymers of higher molecular weight are obtained with acrylic acid alone. Moreover, the free radical polymerization of macromolecules, which have a polymerizable double bond at one end of the chain, is hindered for steric reasons. It is, however, possible to synthesize copolymers with molecular weights of 10,000 and much higher by the inventive process.

Especially, polyoxyalkylene ethers of allyl and/or methallyl alcohol of the following general formula

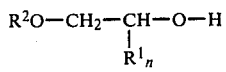

are used for the inventive process. In this formula, $R^1$ represents a hydrogen radical or a hydrocarbon group with 1 to 30 carbon atoms which optionally may be halogenated. Ethylene oxide, propylene oxide, butylene oxide or $\alpha$-olefin oxide of long-chain hydrocarbons with up to 30 carbon atoms are therefore used as alkylene oxides. The polyoxyalkylene chains may be built up from the same or from different alkylene oxides. By appropriately matching the oxyethylene and oxypropylene units or units of longer hydrocarbon chains, the hydrophobicity or hydrophilicity of the copolymers can be controlled within the desired limits so that it is possible to synthesize products which are readily soluble in water as well as products which are insoluble in water, or whose cloud points in aqueous solution can be adjusted at will.

$R^2$ is an allyl or methallyl radical.

n is a whole number greater than 1 and especially not less than 5.

As vinyl compounds capable of copolymerizing, especially those vinyl compounds are used whose alkyl groups comprise 1 to 4 carbon atoms, such as, vinyl acetate, vinyl propionate and vinyl butyrate, as well as mixtures of vinyl esters with up to 50 mole percent of alkyl esters of acrylic or methacrylic acid, whose alkyl groups have 1 to 20 carbon atoms, such as, methyl acrylate, methyl methacrylate, butyl acrylate, butyl methacrylate, lauryl methacrylate or stearyl methacrylate.

High polymerization yields and at the same time, copolymers of high molecular weight are preferentially obtained in the copolymerization of polyoxyalkylene ethers of allyl and/or methallyl alcohols with vinyl esters of lower carboxylic acids or their mixtures with acrylic or methacrylic esters, if the amount of vinyl compounds to be copolymerized is matched to the molecular weight of the polyoxyalkylene ether used. In an especially preferred modification of the inventive process therefore, the ratio of the molecular weight of the polyoxyalkylene ether to the number of the moles of vinyl compounds to be polymerized is 100 to 300. This means that if, for example, a polyoxyalkylene ether of a molecular weight of 1,000 is used, the 3- to 10-fold molar amount of vinyl monomers which are to be copolymerized, should be employed. The copolymerization yield is then greater than 90% and products are obtained whose molecular weight exceeds 10,000 and especially is not less than 20,000.

Whereas the copolymerization of polyoxyalkylene ethers of allyl and/or methallyl alcohol with esters of either acrylic or methacrylic acid alone proceeds only with unsatisfactory yields in that a large portion of the polyoxyalkylene ether remains unreacted, it is apparent that, when vinyl and methacryl esters are used together, the polyoxyalkylene ether is largely incorporated into the polymer formed during the reaction. The polymerization is conducted in a manner known to those skilled in the art and can be carried out in bulk without solvents or in dilution or solution. Since the polymers have a relatively low viscosity, it generally suffices to carry out the reaction without diluents or solvents. Suitable solvents include aromatic hydrocarbons, such as, benzene and toluene, chlorinated hydrocarbons, such as, chloroform and carbon tetrachloride, lower alcohols, such as, methanol and ethanol, ketones, such as, acetone and methyl ethyl ketone, and mixtures thereof. The polymerization is conducted at temperatures of 50° to 130° C. As polymerization initiators, azo compounds or peroxides, such as, for example, azobisisobutyronitrile, benzoyl peroxide, cumene hydroperoxide or dicumene peroxide can be used in amounts of 0.1 to 2 weight percent, based on the monomers. In the polymerization, it is advisable to add the low molecular comonomers slowly to the allyl polyether. The initiator may be dissolved in the comonomers.

The inventively obtained copolymers are generally low viscosity substances. In accordance with a further object of the present invention, they are especially suitable for the production of polyurethanes as reaction components having hydroxyl groups. The polyurethane foams are distinguished by outstanding mechanical properties and especially by high compression hardness.

The inventively synthesized polymers with laterally linked polyoxyalkylene chains can also be reacted with polyisocyanates, as well as known higher molecular weight compounds having groups reactive toward isocyanates, and/or chain extension agents, to form homogeneous or foam-like polyurethane plastics.

The following examples illustrate the invention:

EXAMPLE 1

(A) Synthesis of an Allyl Polyether Monool (not in accordance with the invention)

116 g of allyl alcohol (approximately 2 moles) and 21 g (approximately 0.3 moles) of potassium methylate are added to a reactor having a forced circulation system. After being flushed carefully with pure nitrogen, the reactor is heated to 110° C. and 1276 g (approximately 22 moles) of propylene oxide are added at such a rate that the internal temperature of the reactor does not exceed 120° C. and the internal pressure does not exceed 6 bar. When the introduction of the alkylene oxide is completed, the temperature is maintained at 115° C. until a constant pressure indicates the end of the post-reaction period. The residual monomers are then removed at 80° to 90° C. under vacuum.

The product obtained is neutralized with the help of phosphoric acid, the water is removed by distillation and the sodium phosphate formed is removed by filtration using a filter aid. The hydroxyl number of the product is 92.7, assuming a functionality of 1, this corresponds to a molecular weight of 605. The iodine number is 36.5 and therefore corresponds to a double bond content of 87.0 mole percent.

(B) Copolymerization of the Allyl Polyether Monool with Vinyl Acetate (in accordance with the invention)

The allyl polypropylene oxide monool (605 g, approximately 1 mole) obtained in A) is heated to 80° C. in a threeneck flask under a stream of nitrogen. Vinyl acetate (430 g, approximately 5 moles) in which 8.4 g of azobisisobutyronitrile is dissolved, is then added at regular intervals over a period of 2 hours. Subsequently, four 1 g amounts of azobisisobutyronitrile are added over a period of 2 hours, the temperature being maintained at 80° C. This is finally followed by a post-reaction period of 2 hours at the same temperature.

Any free vinyl acetate still remaining is distilled off under vacuum. The polymerization yield, based on the vinyl acetate and calculated from the amount of monomers collected in the cold trap, is 92% of the theoretical. From the determination of the iodine number (3.0), it can be concluded that approximately 86.5% of the allyl polypropylene oxide monool was consumed in the copolymerization. Gel chromatographic examination shows that the molecular weight is approximately 20,000. From this, it may be concluded that a comblike polymer was obtained, in which the macromolecules, occurring most frequently, have about 20 side branches.

EXAMPLE 2 to 18

A series of allyl polyether monools with different ethylene and propylene oxide contents and adjusted to different molecular weights, was synthesized by the method of Example 1 (A) and copolymerized, partly at different molar ratios, with vinyl acetate. The amounts of ethylene and propylene oxides in the polyether used, the molecular weight calculated from the hydroxyl number assuming a functionality of 1, and the molar content of double bonds, that is, the content of allyl polyether monools, are given in Table 1. The amount of allyl alcohol, used in each alkylene oxide polymerization, is 50.5 g (0.87 moles) and the amount of potassium methylate used as catalyst is 9.1 g (approximately 0.13 moles). Moreover, the molar ratio of vinyl acetate to allyl polyether, the yield of copolymer as calculated from the iodine number and the most frequent molecular weight as determined from gel chromatographs, are given in the table. The azobisisobutyronitrile initiator is used in the concentrations and time intervals given in Example 1 (B).

It can be seen that, with increasing molecular weight of the allyl polyether, the molar ratio of vinyl acetate to polyether must be increased in order to obtain high polymerization yields. The molecular weight of the copolymer also increases with increasing vinyl acetate content.

TABLE 1

| Example No. | Ethylene Oxide/ Propylene Oxide (g/g) | Molecular Weight from OH Number | Double Bond (Mol-%) | Molar Ratio of Vinyl Acetate to Allyl Polyether | Yield from Iodine No. (% of Theoret.) | Molecular Weight from GPC* |
|---|---|---|---|---|---|---|
| 2 | 133/111 | 296 | 87.3 | 2.0 | 71.3 | 18 000 |
| 3 | 133/111 | 296 | 87.3 | 3.0 | 89.5 | 19 000 |
| 4 | 279/187 | 510 | 94.5 | 2.5 | 84.0 | 20 000 |
| 5 | 0/570 | 605 | 87.0 | 2.5 | 82.0 | 18 000 |
| 6 | 0/570 | 605 | 87.0 | 5.0 | 86.5 | 19 500 |
| 7 | 0/570 | 605 | 87.0 | 9.0 | 90.2 | 21 000 |
| 8 | 0/570 | 605 | 87.0 | 12.0 | 93.4 | 25 000 |
| 9** | 0/779 | 800 | 86.2 | 9.0 | 88.2 | 23 000 |
| 10 | 114/653 | 808 | 79.2 | 3.0 | 65.0 | 14 000 |
| 11 | 114/653 | 808 | 79.2 | 6.0 | 79.3 | 17 000 |
| 12 | 39/754 | 820 | 75.6 | 4.5 | 78.2 | 12 500 |
| 13 | 81/754 | 855 | 78.5 | 4.5 | 76.3 | 11 000 |
| 14 | 146/1090 | 1247 | 86.0 | 6.0 | 72.0 | 14 000 |
| 15 | 820/1050 | 1839 | 83.4 | 9.0 | 78.0 | 27 000 |
| 16 | 1069/1335 | 2367 | 86.5 | 9.0 | 79.2 | 40 000 |
| 17 | 1069/1335 | 2367 | 86.5 | 15.0 | 89.5 | 46 000 |
| 18 | 1069/1335 | 2367 | 86.5 | 21.0 | 93.7 | 49 500 |

*Most frequent molecular weight from gel phase chromatogram
**Synthesized using 72 g (ca. 1 mole) of methallyl alcohol as starting alcohol The following comparison examples show that copolymerization of polyoxyalkylene ethers of allyl and/or methallyl alcohol with vinyl ethers styrenes, methyl methacrylates or acrylic acid is either impossible or proceeds only with unsatisfactory yields. Clearly, the skilled artisan could not have foreseen the course of the inventive process.

COMPARISON EXAMPLE 1

The polypropylene oxide monool (605 g, approximately 1 mole) obtained in Example 1 (A), is copolymerized as in Example 1 (B) with 500 g (approximately 5 moles) of n-butyl vinyl ether, initiated with a total amount of 29.2 g of azobisisobutyronitrile. The post-reaction period in this case is 4 hours.

The remaining free butyl vinyl ether is removed by distillation under vacuum. The iodine number showed that only 39.8% of the allyl polyether is consumed.

COMPARISON EXAMPLE 2

The propylene oxide monool (605 g, approximately 1 mole) obtained in Example 1 (A), is heated as in Example 1 (B) with 520 g (approximately 5 moles) of styrene and a total of 29.2 g of azobisisobutyronitrile is added. After a reaction time of 6 hours at 80° C., a two-phase system is obtained which consists of polystyrene and, as evident from the iodine number, of unreacted allyl polyether.

COMPARISON EXAMPLE 3

The propylene oxide monool (605 g, approximately 1 mole), obtained in Example 1 (A), is heated with 500 g (approximately 5 moles) of methyl methacrylate and a total of 29.2 g of azobisisobutyronitrile is added. After a reaction period of 6 hours at 80° C., a two-phase system is obtained consisting of polymethylmethacrylate and, as determined from the iodine number, of unreacted allyl polyether which showed that only 31.4% of the allyl polyether are consumed.

COMPARISON EXAMPLE 4

An allyl ethylene oxide monool (53 g approximately 0.1 moles), with an average of 10 monomer units, is dissolved in 600 g of water. To the solution, heated to 95° C. under pure nitrogen, a solution of 216 g (approximately 3 moles) of acrylic acid and 3.5 g of $(NH_4)_2S_2O_8$ in 400 g of water is added over a period of 120 minutes, the temperature being maintained at 95° C. Gelling occurs after the addition of 2.5 moles of acrylic acid. The water-free product is not soluble.

COMPARISON EXAMPLE 5

Azobisisobutyronitrile (1.3 g) is dissolved in 121 g (approximately 0.2 moles) of an allyl polypropylene oxide monool having an average of 10 monomer units and the solution is heated to 80° C. under pure nitrogen. Acrylic acid (72 g, approximately 1 mole) is added dropwise. Gelling commences after half a mole of acrylic acid is introduced. The product obtained is not soluble.

COMPARISON EXAMPLE 6

An allyl polypropylene oxide monool (121 g, approximately 0.2 moles) having an average of 10 monomer units is mixed with 121 g of a 1:1 by volume mixture of toluene and ethanol Azobisisobutyronitrile (1.6 g) is added and the mixture is heated to 80° C. under pure nitrogen. Acrylic acid (72 g, approximately 1 mole) is then added dropwise and 1.6 g of azobisisobutyronitrile are added three times at 1 hours intervals. The reaction is discontinued after a total of 6 hours.

The volatile components are removed completely by distillation. The iodine number of the product obtained shows that 75% of the theoretical amount of the allyl polyether are reacted. The gel chromatographic analysis of the product showed that an average molecular weight of only 910 was reached.

EXAMPLE 19

A polyether was synthesized from 58 g (approximately 1 mole) of allyl alcohol and 572 g (approximately 13 moles) of ethylene oxide by the procedure of Example 1 (A). The product obtained has a hydroxyl number of 92.2 which, assuming a functionality of 1, corresponds to a molecular weight of 608. The iodine number is 36.6, corresponding to an 88 mole percent content of double bonds.

The polyether obtained is copolymerized by the procedure of Example 1 (B) with a mixture of 100.6 g (approximately 1.2 moles) of vinyl acetate and 59.3 g (approximately 0.23 moles) of lauryl methacrylate by the procedure of Example 1 (B). At the start of the reaction, 1.6 g of azobisisobutyronitrile are added, the same amount of initiator is then added after 1, 2 and 3 hours.

The free volatile monomer remaining is distilled under vacuum. The iodine number of 3.1 showed that 84% of the allyl polyethylene oxide monool was consumed in the copolymerization. Gel chromatographic analysis showed a very broad molecular weight distribution with a molecular weight range from 1,000 to 100,000 without a clear maximum.

EXAMPLE 20 to 23

A series of allyl polyether monools with different ethylene and propylene oxide contents and synthesized to have different molecular weights were copolymerized with mixtures of vinyl acetate and lauryl or stearyl methacrylate in different molar ratios. The amount of ethylene and propylene oxides in the polyether used, the molecular weight calculated from the hydroxyl number by assuming a functionality of 1, and the molar content of double bonds, that is, the allyl polyether monool content, are given in Table 2. The amount of allyl alcohol used in each alkylene oxide polymerization is 58 g (1 mole) and the amount of potassium methylate used as catalyst is 7 g (approximately 0.1 moles). Moreover, the amounts of allyl polyether, vinyl acetate, lauryl or stearyl methacrylate in moles, as well as the yield of copolymer, as determined from the iodine number and the most frequent molecular weight or molecular weight range, as calculated from gel chromatographic examination, are given in Table 2.

APPLICATION EXAMPLE 1

The copolymer (210 g) of hydroxyl number 26.7 obtained as in Example 7, 7.2 g of water, 0.45 g of bis-(2-N,N'-dimethylaminoethyl)ether, 4 g of a stablizer based on a polysiloxane-polyether block copolymer and 0.8 g of tin(II) octoate are mixed for 2 minutes in an impeller-type mixer. After about 1 minute, 82.0 g of a mixture of 80 weight percent of 2,4-toluylene diisocyanate and 20 weight percent of 2,6-toluylene diisocyanate with a TDI index of 105 is added and the whole is stirred at high speed for a few seconds. A yellowish polyurethane foam with a specific gravity of 31 kg/m$^3$, a tensile strength of 1.40 kg/cm$^2$, an extension of 105%, and a compression hardness at 25% compression of 0.072 kg/cm$^2$ is obtained.

APPLICATION EXAMPLE 2

The procedure of Application Example 1 is followed, 262 g of copolymer obtained as in Example 15 and having a hydroxyl number of 21.4, 7.2 g of water, 0.5 g of bis-2-(N,N'-dimethylaminoethyl)ether, 4.5 g of a stabilizer based on a polysiloxane-polyether block copolymer and 0.8 g of tin(II) octoate being mixed. Subsequently, 82.0 g of the toluylene diisocyanate are added. A slightly yellowish polyurethane foam with a specific gravity of 30.5 kg/cm$^3$, a tensile strength of 1.31 kg/cm$^2$, an extension of 115%, and a compression hardness at 25% compression of 0.061 kg/cm$^2$ is obtained.

TABLE 2

| Example No. | Ethylene Oxide/ Propylene Oxide (wt. %/wt. %) | Molecular Weight from OH No. | Amount Polyether (moles) | Amount Vinyl- acetate (moles) | Amount Laurylmeth- acrylate (moles) | Amount Stearylmeth- acrylate (moles) | Amount** Azobisiso- butyro- nitrile (g) | Yield from Iodine No. (%) | Molecular weight from GPL |
|---|---|---|---|---|---|---|---|---|---|
| 20 | 100/0 | 608 | 0.23 | 1.2 | — | 0.23 | 7.2 | 85 | $10^3$–$10^5$ |
| 21 | 100/0 | 270 | 0.50 | 2.0 | 0.5 | — | 12.0 | 90 | $10^3$–$5 \cdot 10^4$ |
| 22 | 100/0 | 270 | 0.50 | 2.0 | — | 0.50 | 13.2 | 90 | $10^3$–$5 \cdot 10^4$ Max. 12000 |
| 23* | 30/70 | 1753 | 0.20 | 4.0 | 0.4 | 0.40 | 30.0 | 79 | $10^3$–$6 \cdot 10^4$ Max. 13000 |
|  | 100/0 | 608 | 0.40 |  |  |  |  |  |  |

TABLE 2-continued

| Example No. | Ethylene Oxide/ Propylene Oxide (wt. %/wt. %) | Molecular Weight from OH No. | Amount Polyether (moles) | Amount Vinyl-acetate (moles) | Amount Laurylmeth-acrylate (moles) | Amount Stearylmeth-acrylate (moles) | Amount** Azobisiso-butyro-nitrile (g) | Yield from Iodine No. (%) | Molecular weight from GPL |
|---|---|---|---|---|---|---|---|---|---|
| | 100/0 | 270 | 0.40 | | | | | | |

*The copolymer contains three different allyl polyethers.
**The initiator is added in equal parts at the beginning of the reaction and three times after 1 hours intervals.

We claim:

1. A process for the synthesis of polymers with laterally linked polyoxyalkylene chains by the free radical polymerization of polyoxyalkylene ethers with olefinic double bonds with other vinyl compounds, capable of copolymerizing comprising copolymerizing polyoxyalkylene ethers of allyl alcohol, methallyl alcohol, or mixtures thereof with vinyl esters of lower carboxylic acids or mixtures of vinyl esters of lower carboxylic acids with up to 50 mole percent of esters of acrylic or methacrylic acid.

2. The process of claim 1 wherein the polyoxyalkylene ethers of allyl or methallyl alcohol have the formula

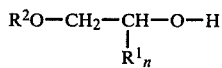

in which
R$^1$ is a hydrogen radical or halogenated hydrocarbon group with 1 to 30 carbon atoms,
R$^2$ is an allyl or methallyl radical and
n is a whole number greater than 1.

3. The process of claim 1 wherein the ratio of the molecular weight of the polyoxyalkylene ether to the number of moles of compounds to be copolymerized is 100 to 300.

4. The process of claim 2 wherein the ratio of the molecular weight of the polyoxyalkylene ether to the number of moles of compounds to be copolymerized is 100 to 300.

5. In a method for the production of polyurethanes wherein a component having hydroxyl groups is reacted with an isocyanate, the improvement which comprises said hydroxyl group containing compound being the polymer of claim 1.

6. In a method for the production of polyurethanes wherein a component having hydroxyl groups is reacted with an isocyanate, the improvement which comprises said hydroxyl group containing compound being the polymer of claim 2.

7. In a method for the production of polyurethanes wherein a component having hydroxyl groups is reacted with an isocyanate, the improvement which comprises said hydroxyl group containing compound being the polymer of claim 3.

8. Polyurethanes produced by the method of claim 5.

* * * * *